United States Patent
Warren et al.

(10) Patent No.: US 6,265,514 B1
(45) Date of Patent: Jul. 24, 2001

(54) POLY(SILOXANE-ACRYLATE) ELASTOMERS WITH OXYCARBONYLETHYLENEIMINO-CONTAINING ORGANIC GROUP AND METHOD OF MAKING THE SAME

(75) Inventors: Stephen Clay Warren; Michael Ward Skinner; Jon Vierling DeGroot, Jr., all of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/505,794

(22) Filed: Feb. 17, 2000

(51) Int. Cl.$^7$ .................................................. C08G 77/08
(52) U.S. Cl. ................................ 528/24; 528/26; 528/31; 528/32; 556/418
(58) Field of Search .................................. 528/26, 31, 24, 528/32; 556/418

(56) References Cited

U.S. PATENT DOCUMENTS

| | | | |
|---|---|---|---|
| 4,603,086 | * 7/1986 | Fujii et al. | 428/447 |
| 4,698,406 | 10/1987 | Lo et al. | 528/12 |
| 5,739,192 | 4/1998 | Blizzard et al. | 524/379 |

FOREIGN PATENT DOCUMENTS

| | | |
|---|---|---|
| 230242 | 12/1987 | (EP) . |
| 274699 | 12/1987 | (EP) . |

* cited by examiner

Primary Examiner—Margaret G. Moore
(74) Attorney, Agent, or Firm—Jennifer S. Warren

(57) ABSTRACT

Poly(siloxane-acrylate) elastomers with low weep characteristics are formed by the steps of:

(A) forming an amine functional alkenyl-containing siloxane by mixing and heating:
- (a) a polydiorganosiloxane,
- (b) an amino-functional silane hydrolyzate,
- (c) an alkenylorganosiloxane, and
- (d) a base equilibration catalyst, then (B) reacting, at room temperature, the amine functional alkenyl-containing siloxane with an acrylate to form a curable alkenyl-containing poly(siloxane-acrylate) with oxycarbonylethyleneimino-containing organic groups, and (C) curing the alkenyl-containing poly(siloxane-acrylate) to form an poly(siloxane-acrylate) elastomer.

14 Claims, No Drawings

POLY(SILOXANE-ACRYLATE) ELASTOMERS WITH OXYCARBONYLETHYLENEIMINO-CONTAINING ORGANIC GROUP AND METHOD OF MAKING THE SAME

For which the following is a specification:

This invention pertains to curable organo-silicone compositions and a method of making them. In particular, this invention pertains to alkenyl-functional poly(siloxaneacrylates) with pendant oxycarbonylethyleneimino-containing organic groups. These poly(siloxane-acrylates) can be cured into elastomers which have low or minimal weep characteristics when exposed to power train oils.

BACKGROUND OF THE INVENTION

For many years the automotive industry has been faced with a problem in their silicone rubber based power train sealing gaskets called "weep". Weep occurs due to a temperature dependency of the swell of silicone rubber in engine oil. Swell describes the tendency of an elastomer in contact with certain fluids to change in linear dimensions, as a function of time and temperature, as the fluids are adsorbed into the elastomer matrix. Silicone rubbers swell more at higher temperatures ($T_2$) than at ambient temperature ($T_1$). Upon cooling the extra oil which is taken up in going from ambient temperature to higher temperature is expelled out of the material, forming weep, allowing oil to pass through the gasket.

Blizzard et. al in U.S. Pat. No. 5,739,192 teach polysiloxane copolymers produced by a Michael Addition reaction between polysiloxanes containing amine functional groups and acrylates having hydrocarbon containing groups. However, this patent does not teach a method of making alkenyl-functional poly(siloxane-acrylates) which are curable via free radical and hydrosilylation methods.

Lo et. al in U.S. Pat. No. 4,698,406 teach a curable two-part silicone composition comprising (i) an amine-functional polyorganosiloxane and (ii) acryl-functional polyorganosiloxane selected from acryloxy, methacryloxy or acrylamide-functional polyorganosiloxanes. Components (i) and (ii) of the composition cure by a Michael-type addition to form a solid polyorganosiloxane resin or elastomer.

Pendant methacryl-functional siloxanes have been prepared by reacting pendant aminosiloxanes with difunctional acryl compounds in a Michael-type addition reaction. See for example Lee et al. in EP Pub. No. 230,242, and Griswold et al. in EP Pub. No. 274,699. Siloxanes containing functional methacrylate groups have recently gained importance, because they may be cured by UV irradiation rather than by thermal initiation.

The object of this invention is to make poly(siloxane-acrylate) elastomers with reduced weep when exposed to engine oil and fluids in automotive power trains. Another object of this invention is alkenyl-functional poly(siloxane-acrylates) which are curable to such poly(siloxane-acrylate) elastomers. Another object is a method of making the alkenyl-functional poly(siloxane-acrylates) with pendant oxycarbonylethyleneimino-containing organic groups using a Michael-type addition.

SUMMARY OF INVENTION

This invention is poly(siloxane-acrylate) elastomers with low weep characteristics. This invention provides a novel route using Michael addition chemistry to provide curable alkenyl-functional poly(siloxane-acrylates). The alkenyl-functional poly(siloxane-acrylates) of this invention are synthesized by initially making amine functional alkenyl-containing siloxanes by mixing and heating a polydiorganosiloxane, and amino-functional silane hydrolyzate, a vinyl organosiloxane, and a base equilibration catalyst. The amine functional siloxanes are then reacted by means of a Michael addition reaction with an acrylate at room temperature to form alkenyl-functional poly(siloxane-acrylates) with oxycarbonylethyleneimino-containing organic groups. The oxycarbonylethyleneimino-containing organic groups may also be referred to as polar organic groups.

The solubility parameters of the alkenyl-functional poly(siloxane-acrylates), when determined through dilute solution viscosity, ranges from 8.7 $(cal/cm^3)^{1/2}$, in the case where 11 mole percent of the repeat units in the copolymer contained polar organic groups to 9.2 $(cal/cm^3)^{1/2}$, when 53 mole percent contained polar organic groups.

Poly(siloxane-acrylate) elastomers are prepared by conventional silicone cure mechanisms such as a free-radical cure of the poly(siloxane-acrylates) using a suitable peroxide catalyst. These poly(siloxane-acrylate) elastomers show reduced swell as the mole percent of polar organic groups in the elastomer is increased. Poly(siloxane-acrylate) elastomers may also be prepared by a hydrosilylation cure using a hydrosilylation crosslinker and a platinum catalyst.

DETAILED DESCRIPTION OF INVENTION

This invention is poly(siloxane-acrylate) elastomers with low weep characteristics. These elastomers are formed by the steps of:

(A) forming an amine functional alkenyl-containing siloxane by reacting a mixture comprising:
 (a) a polydiorganosiloxane,
 (b) an amino-functional silane hydrolyzate,
 (c) an alkenylorganosiloxane, and
 (d) a base equilibration catalyst, then (B) reacting, at about 23° C., the amine functional alkenyl-containing siloxane with an acrylate to form a curable alkenyl-containing poly(siloxane-acrylate) with oxycarbonylethyleneimino-containing organic groups and, (C) curing the alkenyl-containing poly(siloxane-acrylate) to form an poly(siloxane-acrylate) elastomer.

The amount of swell of an elastomer in a given solvent is controlled by the energetics of the polymer solvent interaction which is contained in a polymer-solvent interaction parameter c, the crosslink density of the polymer matrix, and the number of dimensions in which the sample is constrained. The present inventors chose to reduce the swell by altering the solubility parameter of the silicone rubber by the addition of organic side groups on the siloxane chain. The organic side groups on a siloxane change the parameter c of the resulting cured polymer so that the amount of oil adsorbed at any given temperature is reduced.

Amine Functional Alkenyl-containing Siloxane

The polydiorganosiloxane component (a) can be either a cyclic or linear polydiorganosiloxane. If the polydiorganosiloxane is linear, it can have the formula $R^2{}_3SiO(SiR^1{}_2O)_x SiR^2{}_3$ where x has an average value of from 0 to 15,000, $R^1$ is selected from the group consisting of a trifluoropropyl group, an alkyl chain of 1 to 4 carbon atoms, and a phenyl group, and $R^2$ is selected from the group consisting of an alkenyl group, a hydroxyl group, an alkoxy group, a trifluoropropyl group, an alkyl chain of 1 to 4 carbon atoms, and a phenyl group. The linear polydiorganosiloxanes can be waxes, liquids, or gums having viscosities ranging from 5 to 40,000,000 mPa·s at 25° C., and molecular weights of about 300 to 1,000,000. While x can be any value from 0 to approximately 15,000, a preferred range is from 0 to 1000, where x is most preferably 0 to 100.

If the polydiorganosiloxane is cyclic, it can have the formula $(SiR^1R^2O)_y$, where $R^1$ and $R^2$ are as described above, and y is from 3 to 12. Preferably y is from 3 to 8. Most preferably, $R^1$ is methyl, and $R^2$ is either alkenyl or methyl.

Component (b) is an amino-functional silane hydrolyzate which may be formed by the reaction of water with alkoxysilanes containing an amine functional group, as in the example shown below.

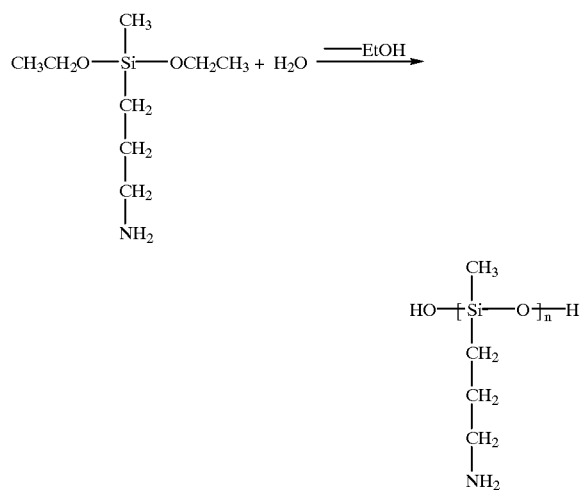

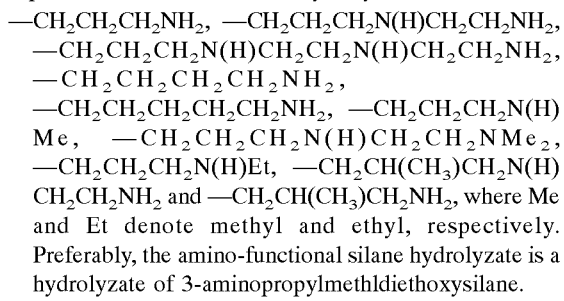

In the above formula, the value of n is not critical, but a preferred range is approximately 1 to 15,000. Preferably n is selected so that the amino-functional silane hydrolyzate is a liquid with a viscosity in the range of about 1000 to 1,000,000 mpa·s at 25° C. An amine functional group is connected to at least one silicone atom of the amino-functional silane hydrolyzate through a silicon-carbon bond and has the general formula:

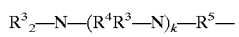

In the above formula, each $R^3$ is a monovalent group independently selected from the group consisting of hydrogen; alkyl having 1 to 18 carbon atoms, such as methyl, ethyl, propyl, isobutyl, hexyl, octyl, decyl, dodecyl and octadecyl; substituted alkyl having 1 to 18 carbon atoms, such as 3-chloropropyl and 3,3,3-trifluoropropyl; aryl having 6 to 16 carbon atoms, such as phenyl and naphthyl; substituted aryl having 6 to 30 carbon atoms, such as chlorophenyl, chlorotolyl and dichloroxylyl; arylalkyl having 7 to 9 carbon atoms, such as benzyl, phenethyl and 3-phenylpropyl; and alkylaryl having 7 to 16 carbon atoms such as tolyl, xylyl, ethylphenyl and propyltolyl. According to the invention, at least one $R^3$ group in the formula is hydrogen. The remaining $R^3$ groups are preferably methyl.

$R^4$ is a divalent hydrocarbon group having 2 to 6 carbon atom, such as ethylene, trimethylene, tetramethylene and hexamethylene, and k is 0, 1 or 2. $R^5$ is a divalent organic connecting group which provides a separation of at least one carbon atom between the nitrogen in the above formula and silicon on the amine functional silane hydrolyzate. $R^5$ must contain at least 1 carbon atom, but its nature is otherwise not critical to the invention, provided that it is chemically stable with respect to hydrolyzable alkoxy groups on the alkoxysilanes and it does not interfere with the reaction of the acrylic functionality of the acrylate and the amine functionality of the amine functional hydrolyzate (b). Preferably, $R^5$ is selected from the group consisting of propylene, butylene and isobutylene. Specific examples of amine-functional groups on the amino-functional hydrolyzate include
—$CH_2CH_2CH_2NH_2$, —$CH_2CH_2CH_2N(H)CH_2CH_2NH_2$,
—$CH_2CH_2CH_2N(H)CH_2CH_2N(H)CH_2CH_2NH_2$,
—$CH_2CH_2CH_2CH_2NH_2$,
—$CH_2CH_2CH_2CH_2CH_2NH_2$, —$CH_2CH_2CH_2N(H)Me$, —$CH_2CH_2CH_2N(H)CH_2CH_2NMe_2$,
—$CH_2CH_2CH_2N(H)Et$, —$CH_2CH(CH_3)CH_2N(H)CH_2CH_2NH_2$ and —$CH_2CH(CH_3)CH_2NH_2$, where Me and Et denote methyl and ethyl, respectively. Preferably, the amino-functional silane hydrolyzate is a hydrolyzate of 3-aminopropylmethldiethoxysilane.

The amount of amino-functional silane hydrolyzate that is used in step (A) will determine the number of sites available for reaction with the acrylate in step (B). The mole percent oxycarbonylethyleneimino-containing organic groups desired in the copolymer is approximately the same as the mole percent amino-functional groups on the amino-functional silane hydrolyzate, based on the total of components (a), (b) and (c) in the mixture of step (A). Preferably, the amount of hydrolyzate added is the amount that will provide from 0.5 to 80 mole percent silicone repeat units with amine groups. This ultimately leads to 0.5 to 80 mole percent oxycarbonylethyleneimino-containing organic groups on the poly(siloxane-acrylate) elastomer. Below 0.5 mole percent there is little effect of the organic groups on the oil swell. Above 80 mole percent there may be an adverse effect on final elastomer properties, e.g. the elastomer may become more brittle.

Component (c) is an alkenylorganosiloxane. Component (c) provides the crosslinking sites for curing the alkenyl-functional poly(siloxane-acrylate) of the invention into poly (siloxane-acrylate) elastomers. The alkenylorganosiloxane component (c) can be either cyclic or linear.

If the alkenylorganosiloxane is linear, it can have the formula $R^7_3SiO(SiR^6_2O)_pSiR^7_3$ where p has an average value of from 0 to 15,000, each $R^6$ is independently selected from the group consisting of an alkenyl group containing 2 to 8 carbon atoms, trifluoropropyl group, an alkyl chain containing 1 to 4 carbon atoms, and a phenyl group, and $R^7$ is selected from the group consisting of alkenyl groups containing 2 to 8 carbon atoms, a trifluoropropyl group, and an alkyl chain containing 1 to 4 carbon atoms, and a phenyl group. While p can be any value from 0 to about 15,000, a preferred range can be from 0 to about 1,000, where x is most preferably 0 to about 100. An example of a preferred alkenylorganosiloxane is vinyldimethylsiloxy terminated dimethylsiloxane with a viscosity of about 5 mPa·s at 25° C.

If the alkenylorganosiloxane is cyclic, it can have the formula $(SiR^6{}_2O)_q$, where $R^6$ is as described above, and q is from 3 to 12. Preferably q is from 3 to 8.

For either cyclic or linear alkenylorganosiloxane, preferably $R^6$ is selected so that component (c) is miscible with component (a) described above. The amount of $R^6$ and $R^7$ groups that are alkenyl will determine the crosslink density of the poly(siloxane-acrylate) elastomers. A minimum of two silicon-bonded alkenyl groups per molecule of the alkenyl-containing organo-siloxane copolymer is required to cure the copolymer into elastomers, with a preferred range of 2 to about 10 alkenyl groups per molecule.

The reaction between components (a),(b), and (c) is carried out using conventional siloxane synthesis, including any conventional base equilibrium catalyst (d). Examples of such catalysts include, but are not limited to alkali metal hydroxides, alkali metal silanolates and alkali metal alkoxides. The temperature and time for the reaction of step (A) will depend on the catalyst selected and is readily determinable by those skilled in the art with reference to the examples herein. When component (d) is potassium hydroxide (KOH), components (a)–(d) are reacted together at about 150° C. for 18 h. After the reaction is complete, the KOH can be neutralized and the resulting polymer is filtered and stripped.

Acrylate

The acrylate in Step (B) is described by the general formula:

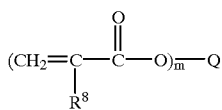

$R^8$ is H or $CH_3$, $m \geq 1$ and Q is an organic group

The acrylate can be either monofunctional, as in the case where m is equal to 1, or multifunctional, where m is greater than 1; however, multifunctional acrylates will add an additional crosslinking site and increase the crosslink density. In the case where m>1, m is preferably in the range from 2 to 5, with the values 2, 3 or 4 being most preferred.

Typical groups Q include polyethers, and aliphatic, aromatic, and alicyclic groups. The Q groups can be functional and reactive, or non-functional or non-reactive. For example, Q can be an alkyl group having from 1 to 100 carbon atoms, including methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl, and 2,2-diethylpentyl; alkenyl groups such as vinyl, allyl, hexenyl, butenyl, 3-octenyl, 4,9-octadecadienyl and 4-nonenyl; alkynyl groups such as propynyl, heptynyl, butynyl, decynyl; alkenynyl groups such as 1-penten-3-ynyl, 2-ethyl-1-buten-3-ynyl; cycloaliphatic groups such as, cyclohexyl, 2,4-dimethylcyclopentyl, cyclohexenyl, bicyclo ([3.1.0]hexyl, tricyclo(3.2.1.1.)-5-nonenyl, spiro(4.5)decyl, dispiro(4.1.4.2)-1-tridecenyl, decahydronaphthyl, 2,3-dihydroindyl and 1,2,3,-tetrahydronaphthyl; aryl groups such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyloctyl, 3-methyl-2-(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl.

In addition Q can be selected from oxyethylene groups, oxypropylene groups, oxybutylene groups, or any combination of oxyethylene groups, oxypropylene groups, or oxybutylene groups. A representative Q is a polyether selected from the group consisting of:

(i) $-(CH_2)_y(OCH_2CH_2)_a(OCH_2CHCH_3)_b(OCH_2CH(CH_2CH_3))_cOR^9$, (ii) $-(CH_2)_y(OCH_2CH_2)_aOR^9$, (iii) $-(CH_2)_y(OCH_2CH_2)_a(OCH_2CHCH_3)_bOR^9$, (iv) $-(CH_2)_y(OCH_2CH(CH_2CH_3))_cOR^9$, (v) $-(CH_2)_y(OCH_2CHCH_3)_b(OCH_2CH(CH_2CH_3))_cOR^9$, (vi) $-(CH_2)_y(OCH_2CH_2)_a(OCH_2CH(CH_2CH_3))_cOR^9$, and (vii) $-(CH_2)_y(OCH_2CHCH_3)_bOR^9$, where $R^9$ can be hydrogen, an alkyl group having from 1 to 4 carbon atoms an aryl radical having 6 to 12 carbon atoms, an aralkyl group having at least 6 carbon atoms; or an acyl group; and y is an integer from 2 to 20; a is 1 to 120; b is 1 to 50; and c is 1–50.

Specific examples of such polyethers include $-(CH_2CH_2O)_8H$, $-(CH_2CH_2O)_{12}H$, $-(CH_2CH_2O)_8CH_3$, $-(CH_2CH_2O)_{12}CH_3$, $-(CH_2CH_2O)_8C(O)CH_3$, $-(CH_2CH_2O)_{20}H$, $-(CH_2CH(CH_2CH_3)O)_{10}CH_3$, and $-(CH_2CHCH_3O)_5C(O)CH_3$ and blends of the above. The molar ratio of amine functional groups (—NH) provided by the amine functional alkenyl-containing siloxane of Step (A) to the acrylate of Step (B) can be varied from 100 to 0.1. Ratios of about 1 to 0.5 are preferred, to ensure that most of the amino groups are reacted.

The amount of acrylate used will determined the physical properties, including weep, of the final cured polymer, as seen in the examples below.

Specific examples of acrylates useful in the practice of the present invention are polyethylene glycol monoacrylate, polypropylene glycol monoacrylate, tetrafluoropropyl acrylate, methoxypoly(ethyleneoxy) ethyl acrylate, 1,6 hexanediol diacrylate, 1,4-butanediol diacrylate, ethylene glycol diacrylate, diethylene glycol diacrylate, tetraethylene glycol diacrylate, triproplyene glycol diacrylate, neopennyl glycol diacrylate, 1,4-butanediol dimethacrylate, poly(butanediol) diacrylate, tetraethyleneglycol dimethacrylate, 1,3-butylene glycol diacrylate, triethylene glycol diacrylate, polyethylene glycol diacrylate, bisphenol A dimethacrylate, trimethylolpropane triacrylate, trimethylolpropane trimethacrylate, pentaerythritolmonohydroxytriacrylate, di-trimethylolpropane tetraacrylate, and dipentaerythritol (monohydroxy) pentaacrylate, diethylene glycol diacrylate, tetraethylene glycol diacrylate, and polyethylene glycol diacrylate.

Most of the curable alkenyl-containing organo-siloxane copolymers described herein can be produced without the aid of a solvent. However, when a solvent is used the solvent is best selected based on solubility of the final product. Typical solvents include aliphatic and aromatic solvents, alcohols, and water. The reaction of Step (B) is a Michael-type addition, also known in the art as a conjugate addition, of the amine group on the siloxane to the double bond on the acrylate. It proceeds at room temperature without a catalyst. The resulting polymers are curable alkenyl-containing poly (siloxane-acrylates) with oxycarbonylethyleneimino-containing organic groups. These resulting polymer can be stripped to remove excess acrylate. The oxycarbonylethyleneimino-containing organic groups may also be referred to as polar organic groups.

Curing the Curable Alkenyl-functional Poly(siloxane-acrylates) to Form Poly(siloxane-acrylate) Elastomers The curing of Step (C) can be accomplished by any of the well-known curing mechanisms known in the silicone elastomer art. For example, the curable alkenyl-functional poly(siloxane-acrylates) of this invention may be cured to the elastomeric state by exposure to electron beams, ultraviolet rays, electromagnetic waves, or heat. Where heat is used as the curing mechanism, an organic peroxide curing agent may be used. Examples of suitable organic peroxide curing agents include 2,5-dimethyl-2,5-di(tert-butylperoxy)hexane, 2,2-bis(t-butylperoxy)-p-diisopropylbenzene, 1,1,bis(t-butylperoxy)-3,3,5-trimethylcyclohexane, 2,5-dimethyl-2,5-di(tert-butylperoxy)hexyne-3, di-tbutylperoxide, benzoyl peroxide, p-chlorobenzoyl peroxide, dicumyl peroxide, tertiary butyl peracetate, tertiary butyl perbenzoate, monochlorobenzoyl peroxide, 2,4-dichlorobenzoyl peroxide, and tertiary butyl cumyl peroxide. The amount of catalyst used will depend on the type of catalyst and can be determined by experimentation. Generally, peroxide catalysts are useful in amount from about 0.05 to 10 parts, and more preferably 0.1 to 5 parts by weight catalyst per 100 parts by weight of the curable alkenyl-containing poly(siloxane-acrylate) formed in Step (B).

Another heat curing system which is applicable is one in which the curable alkenyl-functional poly(siloxane-acrylate) is cured by crosslinking the copolymer with an organohydrogensiloxane crosslinker in the presence of a platinum group metal-containing catalyst. Those skilled in the art will recognize that the presence of any residual or primary or secondary amine groups in the poly(siloxane-acrylate) may have an inhibiting effect this cure system, and that conventional measures such as amine removal may be needed to reduce the effect of this inhibition. The organohydrogensiloxane crosslinker must contain an average of at least two silicon-bonded hydrogen atoms per molecule, and no more than one silicon-bonded hydrogen atom per silicon atom, the remaining valences of the silicon atoms being satisfied by divalent oxygen atoms or by monovalent hydrocarbon groups comprising one to about seven carbon atoms. The monovalent hydrocarbon radicals can be, for examples, alkyls such as methyl, ethyl, propyl, tertiary butyl, and hexyl; cylcoalkyls such as cyclohexyl; and aryls such as phenyl and tolyl. Such materials are well known in the art. The molecular structure of the organohydrogensiloxane may be linear, linear with branching, cyclic, or network-form. There are no particular restrictions on the molecular weight of the organohydrogensiloxane, however it is preferable that the viscosity at 25° C. be about 3 to 10,000 mpa·s. The amount of such organohydrogensiloxane crosslinker that is added to the composition is an amount such that the ratio of the number of moles of hydrogen atoms bonded to silicon atoms to the number of moles of alkenyl groups bonded to silicon atoms is in the range of 0.5:1 to 20:1, preferably in the range of 1:1 to 5:1 and more preferably in the range of 2.5:1 to 5:1. If this molar ratio is less than 0.5, curing of the present composition may become insufficient, while if this molar ratio exceeds 20 hydrogen gas is evolved so that foaming may occur.

The platinum group metal-containing catalyst can be any such catalyst which is known to catalyze the reaction of silicon-bonded hydrogen atoms with silicon-bonded alkenyl groups. By platinum group metal, it is meant ruthenium, rhodium, palladium, osmium, iridium, and platinum. Preferred is when the metal is platinum. Examples of such platinum catalysts include chloroplatinic acid, alcohol solutions of chloroplatinic acid, complexes of chloroplatinic acid with olefins, complexes of chloroplatinic acid with divinylsiloxane, platinum black, metallic platinum, and catalysts in which metallic platinum is supported on a support. The amount of platinum group metal-containing catalyst that is added varies according to the type of catalyst that is used, and is not especially restricted; generally, the amount added is 1 to 1,000 parts by weight, preferably 5 to 100 parts by weight platinum group metal, per 1,000,000 parts by weight of the curable alkenyl-functional poly(siloxane-acrylate).

EXAMPLES

Synthesis of 3-Aminopropylmethyldiethoxysilane Hydrolyzate

Stock batches of 3-aminopropylmethyldiethoxysilane hydrolyzate (AH-1 and AH-2) were made to be used in the synthesis of amine functional siloxanes by procedures described below to make a hydrolyzate (AH-2) is as follows: a 3000 ml 3-neck flask was equipped with a thermometer assembly w/nitrogen purge, mechanical stirrer, and a simple distillation assembly. The flask was charged with 2700 g of 3-aminopropylmethyldiethoxysilane, 890 g distilled water, and purged with nitrogen. The temperature controller on the flask was set at 150° C. and the reaction mixture was heated. Ethanol began distilling over at a pot temperature of 81° C. Upon removal of most of the ethanol the temperature was stabilized at 150° C. and the reaction was allowed to react for 21 h. A vacuum was applied for 8 h to drive off all remaining ethanol and water. The resulting hydrolyzate was used in the synthesis of the amine functional alkenyl-containing siloxanes copolymers as described below.

Synthesis of Amino-Functional Vinyl-Containing Siloxane Copolymers

Initially, four amine functional vinyl-containing siloxane copolymers were made with approximately 10 mol % (AFP-1), 3 0 mol % (AFP-2), 5 0 mol % (AFP-3) and 70 mol % (AFP-4) 3-aminopropylmethylsiloxane groups. The copolymers were designed with an average of three pendant vinyls to serve as cure sites in subsequent crosslinking reactions. The formulations for each for each of the aminofunctional polymers is contained in Table 1.

TABLE 1

Stoichiometry for Amine Functional Vinyl-Containing Siloxanes (pendant vinyls only)

| Polymer | octamethylcyclo-tetrasiloxane | trimethyl endblocked siloxane | 3-aminopropylmethyl-diethoxysilane hydrolyzate | potassium hydroxide | cyclic alkenyl-organosiloxane |
|---|---|---|---|---|---|
| AFP-1 | 617.18 | 25.96 | 111.6 | 0.56 | 8.25 |
| AFP-2 | 475.70 | 23.40 | 301.95 | 0.56 | 7.44 |
| AFP-3 | 355.91 | 21.30 | 458.25 | 0.56 | 6.75 |
| AFP-4 | 262.06 | 19.50 | 584.70 | 0.56 | 6.15 |

The four copolymers were stripped at 160° C. to 180° C. under 0.5 mm Hg using a thin film stripper and then characterized by Gel Permeation Chromatography (GPC). The GPC data are summarized in Table 2.

TABLE 2

GPC data for Amine Functional Vinyl-Containing Siloxanes

| Polymer | $M_n$ | $M_w$ | $M_w/M_n$ | % Polymer | % Cyclics |
|---|---|---|---|---|---|
| AFP-1 | 13,390 | 31,940 | 2.39 | 96.4 | 3.6 |
| AFP-2 | 14,010 | 28,570 | 2.04 | 95.2 | 4.8 |
| AFP-3 | 10,490 | 16,420 | 1.57 | 89.7 | 10.3 |
| AFP-4 | 5,135 | 7,050 | 1.38 | 63.4 | 36.6 |

An additional three amine functional vinyl-containing siloxane copolymers were made with approximately 11 mol % (AFP-5), 33 mol % (AFP-6), and 54 mol % (AFP-7) 3-aminopropylmethylsiloxane groups, according to calculations from integrated $^{13}$C NMR spectra discussed in this section of the report. The polymers were designed with the cure site only at the terminal ends of the polymer, thus, vinyl cyclics were not used. The formulations for these three amine functional vinyl-containing siloxane copolymers is listed below in Table 3.

TABLE 3

Stoichiometry for Amine Functional Vinyl-Containing Siloxanes (terminal vinyls only)

| Polymer | octa-methylcyclo-tetrasiloxane | dimethylvinyl endblocked siloxane | 3-aminopropylmethyl-diethoxysilane hydrolyzate | potassium hydroxide |
|---|---|---|---|---|
| AFP-5 | 617.20 | 23.77 | 111.80 | 0.63 |
| AFP-6 | 429.00 | 21.35 | 301.89 | 0.66 |
| AFP-7 | 274.36 | 19.40 | 458.30 | 0.63 |

The GPC's of the polymers after stripping (AFP-5, AFP-6, AFP-7) are shown in Table 4.

TABLE 4

GPC data for Amine Functional Vinyl-Containing Siloxanes (after stripping)

| Polymer | $M_n$ | $M_w$ | $M_w/M_n$ | % Polymer | % Cyclics |
|---|---|---|---|---|---|
| AFP-5 | 14,750 | 32,520 | 2.20 | 96.9 | 3.1 |
| AFP-6 | 11,420 | 22,060 | 1.93 | 89.7 | 10.3 |
| AFP-7 | 6,790 | 9,938 | 1.46 | 74.2 | 25.8 |

An example of the synthetic procedure used to make an amine functional vinyl-containing siloxane copolymer (AFP-5) is as follows: a 1000 ml 3-neck flask was equipped with a thermometer assembly, mechanical stirrer, and condenser. The flask was charged with 617.2 g octamethylcyclotetrasiloxane, 23.8 g dimethylvinyl end blocked siloxane DP=7, 111.8 g 3-aminopropylmethyldiethoxysilane hydrolyzate and 0.6302 g potassium hydroxide (KOH). The flask was purged with nitrogen, the temperature controller on the reaction was set at 150° C., and the reaction mixture was heated. The reaction was allowed to react for 18 h. The reaction mixture was then cooled to 130° C. and 0.99 g of propionic acid was added to neutralize the KOH. The copolymer was filtered, using 80 psi nitrogen, through a 0.8 micron filter. The polymer was stripped at 160° C. under high vacuum using a thin film stripper.

The procedure to make copolymers with pendant amine containing groups is the same as described for AFP-5 in the previous paragraph; however, trimethyl end blocked siloxane was used instead of dimethylvinyl end blocked siloxane, and cyclic alkenylorganosiloxane was added to give pendant vinyl groups.

The stripped polymers with terminal vinyl substitution (AFP-5, AFP-6, AFC-7) were analyzed by $^{13}$C and $^{29}$Si NMR. The $^{13}$C NMR spectra showed chemical shifts for the carbons of the 3-aminopropylmethylsiloxane group as follows:

—Si—$CH_3$=–1 ppm, —Si—$CH_2$—=14 ppm, —Si—$CH_2$—$CH_2$—=27 ppm, and —$CH_2$—$NH_2$=45 ppm. Integrated $^{13}$C NMR spectra were used to calculate the mole percent of the 3-aminopropylmethyl-siloxane groups relative to dimethylsiloxane groups in the three copolymers. The calculations yielded 11 mol %, 33 mol %, and 54 mol % for the AFP-5, AFP-6, and AFC-7 copolymers, respectively. Since the stoichiometry of reagents in the polymerizations was set up to yield 10 mol %, 30 mol %, and 50 mol % 3-aminopropyl-methylsiloxane groups in the three copolymers, these calculations illustrate that copolymer structure is relatively easy to control.

The $^{29}$Si NMR spectra for these same polymers (AFP-5, AFP-6, AFC-7) showed chemical shifts as follows: divinyl-methylsiloxy endgroups=–4 ppm, $(CH_3)_2RSiO$—endgroups=–13–17 ppm where R is selected from hydrogen, methyl and ethyl ), $(D(R_2))_4$ (cyclics)=–18–21, and $D(R)_2$ (linears)=–18–26 ppm (where D represents the repeating group —SiO—, and R is a methyl or ethyl). The ratio of divinylmethlysiloxy endgroups to $(CH_3)RSIO$— decreased with increasing amine functionality, indicating an increase in silanol endgroups and a decrease in the number of chains having vinyls on both ends, thus, supporting the lower molecular weights reported by GPC. The integrated $^{29}$Si NMR and $^{13}$C NMR spectra were used to calculate the data shown in Table 5.

TABLE 3

NMR Data on Stripped Amine Functional Vinyl-Containing Copolymers

| Polymer | % Divinylmethyl siloxy endgroups ($^{29}$Si NMR) | % (CH3)RSIO- endgroups ($^{29}$Si NMR) | DP ($^{29}$Si NMR) | mol %- NH$_2$ ($^{13}$C NMR) | Molecular Weight ($^{13}$C and $^{29}$Si NMR) |
|---|---|---|---|---|---|
| AFP-5 | 57 | 43 | 160 | 11 | 12,640 |
| AFP-6 | 39 | 61 | 122 | 33 | 10,776 |
| AFC-7 | 16 | 84 | 56 | 54 | 5,428 |

Synthesis of Poly(siloxane-acrylates)

Four amine functional vinyl-containing copolymers with a theoretical DP=250 with approximately 10 mol % (AFP-1), 30 mol % (AFP-2), 50 mol % (AFP-3) and 70 mol % (AFP-41) of siloxane units containing 3-aminopropyl groups were reacted in a Michael addition with butyl acrylate yielding a series of poly(siloxane-acrylates) with approximately 10 mol % (PSA-1), 30 mol % (PSA-2), 50 mol % (PSA-3), and 70 mol % (PSA-4) of the siloxane units containing a polar organic group. The resulting curable poly(siloxane-acrylates) contained an average of five vinyls, three pendant and two terminal.

As an example of the synthetic procedure to make a poly(siloxane-acrylate) (PSA-2), a 250 ml round bottom flask was equipped with a mechanical stirrer and charged with 100 g amine functional copolymer (AFP-2) and 49.2 g butyl acrylate. The reaction was allowed to proceed for 17 h at ambient temperature. IR spectra were run at reaction times of 5 min, 15 h, and 17 h. The polymers were not stripped after the reaction.

The above described reaction was monitored by IR and showed the presence of the C—H stretch of the terminal vinyl at 1600 cm$^{-1}$ and the C—H stretch of the acrylate double bond at 1630 cm$^{-1}$ and 1640 cm$^{-1}$ at the beginning of the reaction. The IR taken at the end of the reaction showed a disappearance of most of the acrylate double bond peaks at 1630 cm$^{-1}$ and 1640 cm$^{-1}$, indicating that the reaction had proceeded. Also, the vinyl peak at 1600 cm$^{-1}$ was still present, indicating that the vinyls were not reacted in the Michael Addition.

Three amine functional copolymers with a theoretical DP=250 with approximately 11 mol % (AFP-5), 33 mol % (AFP-6), and 54 mol % (AFC-7) of the siloxane units containing 3-aminopropyl groups were reacted in a Michael addition with butyl acrylate, as described above, yielding a series of poly(siloxane-acrylates) with approximately 11 mol % (PSA-5), 33 mol % (PSA-6), and 54 mol % (PSA-7) of the siloxane units containing a polar organic group. The resulting curable poly(siloxane-acrylates) contained 2 terminal vinyls only.

An example of the synthetic procedure to make an poly(siloxane-acrylate) (PSA-5) was as follows: a 250 ml round bottom flask was equipped with a mechanical stirrer and charged with 140.1 g amine functional copolymer (AFP-5) and 25.28 g of butyl acrylate. The reaction was allowed to proceed for 144 h at ambient temperature. The resulting copolymer was stripped at 140° C. under high vacuum using a thin film stripper. IR spectra were run at reaction times of 10 min and 144 h and also after stripping. The IR spectra of the Michael Addition reactions was similar to that described above for PSA-2. The GPC's of the polymers after stripping (PSA-5, PSA-6, PSA-7) are shown in Table 6.

TABLE 6

GPC of Poly(siloxane-acrylates)(after stripping)

| Polymer | $M_n$ | $M_w$ | $M_w/M_n$ | % Polymer | % Cyclics |
|---|---|---|---|---|---|
| PSA-5 | 17,990 | 40,350 | 2.24 | 96.5 | 3.5 |
| PSA-6 | 18,090 | 46,500 | 2.57 | 89.5 | 10.5 |
| PSA-7 | 18,840 | 46,800 | 2.48 | 87.2 | 12.8 |

The stripped poly(siloxane-acrylates) were analyzed by $^{13}$C and $^{29}$Si NMR (PSA-5, PSA-6, PSA-7). The $^{13}$C NMR spectra of samples PSA-5, PSA-6, PSA-7 show that the major product is the secondary amine siloxane polymer with an oxycarbonylethyleneimino-containing organic side group shown in FIG. 1. ACD CNMR software (Copyright a 1994–1996, Advanced Chemistry Development, Inc., 141 Adelaide Street West, Suite 1501, Toronto, Ontario, Canada M5H3L5) was used to assign the chemical shifts for the structure of the major product shown below. The chemical shifts are as follows: a=−1 ppm, b=0 ppm, c=13 ppm, d=14 ppm, e=18 ppm, f=23 ppm, g=30 ppm, h=34 ppm, i=44 ppm, j=52 ppm, k=64 ppm, l=132 ppm, m=139 ppm, n=172 ppm.

Integrated $^{13}$C NMR spectra were used to calculate the mole percent of the polar organic groups relative to dimethylsiloxane groups in the copolymers. The calculations showed that PSA-5, PSA-6, and PSA-7 yielded 11 mol %, 33 mol %, and 53 mol % polar organic groups relative to dimethylsiloxane groups in the copolymers.

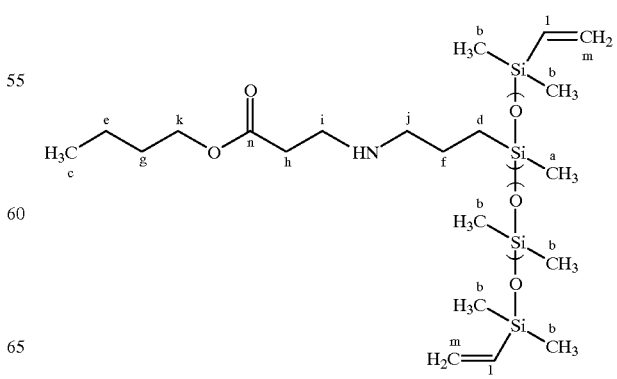

FIG. 1
Vinyl-Containing Poly(siloxane-acrylate)

a = −1 ppm,
b = 0 ppm,
c = 13 ppm,
d = 14 ppm,
e = 18 ppm,
f = 23 ppm,
g = 30 ppm,
h = 34 ppm,
i = 44 ppm,
j = 52 ppm,
k = 64 ppm,
l = 132 ppm,
m = 139 ppm,
n = 172 ppm.

The $^{29}$Si NMR spectra for these same polymers (PSA-5, PSA-6, PSA-7) showed chemical shifts as follows: Divinylmethlysiloxy endgroups=−4 ppm, $(CH_3)RSIO$—=−13–17 ppm, $(D(R_2))_4$ (cyclics)=−18–21, and $D(R_2)$ (linears)=−18–26 ppm, where M, Vi ,OZ, D and $R_2$ are defined as above. The spectra showed that the ratio of Divinylmethlysiloxy endgroups to (CH3)RSIO— decreased with increasing amine functionality, indicating an increase in silanol endgroups and a decrease in the number of chains having vinyls on both ends, thus, supporting the lower molecular weights reported by GPC. This explanation is supported by the fact that the cured poly(siloxane-acrylates) which contained high amounts of $(CH_3)RSIO$— were tacky. The integrated $^{29}$Si NMR and $^{13}$C NMR spectra were used to calculate the data shown in Table 7.

TABLE 7

NMR Data on Stripped Vinyl-Containing Poly(siloxane-acrylates)

| Polymer | % Divinylmethyl Siloxy endgroups ($^{29}$Si NMR) | % (CH3)RSIO- ($^{29}$Si NMR) | DP ($^{29}$Si NMR) | mol % —NH$_2$ ($^{13}$C NMR) | Molecular Weight ($^{13}$C and $^{29}$Si NMR) |
|---|---|---|---|---|---|
| PSA-5 | 81 | 11 | 208 | 11 | 19,335 |
| PSA-6 | 44 | 56 | 142 | 33 | 18,465 |
| PSA-7 | 48 | 42 | 110 | 53 | 17,982 |

Solubility Parameter Testing of Poly(siloxane-acrylates)

Solubility parameter testing of poly(siloxane-acrylates) was done on PSA-5, PSA-6, and PSA-7. A Ubbelohde Cannon 25 D975 or OC B351 viscometer was used. All tests were equilibrated for 20 minutes in a 25° C. constant temperature bath before each run. All solvents and solutions were filtered with a 0.45 μm filter. Each run was done three times to obtain an average. Four concentrations of each polymer solution were run by diluting the original solution three times. Only the 30% copolymer in diacetone alcohol required heat to dissolve (~50° C.). All of the other copolymers dissolved with vigorous stirring. A list of the solvents used and their solubility parameter values is provided in Table 8.

TABLE 8

Solvents and Solubility Parameter Values

| Solubility parameter (cal/cm$^3$)$^{1/2}$ | Solvent |
|---|---|
| 8.5 | n-butyl acetate |
| 8.6 | ethylene glycol dimethyl ether |
| 8.7 | n-butyl bromide |
| 8.8 | n-propyl acetate |
| 8.9 | n-butyl formate |
| 9.1 | THF |
| 9.2 | diacetone alcohol |
| 9.3 | methylethylketone |
| 9.6 | methyl acetate |

The intrinsic viscosity, η, can be related to the solubility parameters through the following equation:

$$\eta = K_1 - K_2 V^n (\Delta\delta)^2$$

Where $K_{1\&2}$ are constants and n=½ or 1. This method is described in *Polymer Handbook*, Third Edition, Brandrup, J.; Immergut E. H., John Wiley & Sons, Inc. New York, 1989, Section VII, p.519, which is hereby incorporated by reference for its teaching on solubility measurements. When a polymer shows the highest intrinsic viscosity in a given solvent it can be inferred that the solubility parameter of the polymer is the same as that of the solvent. This method has the advantage that the polymers can be tested before they are crosslinked thus eliminating crosslink density and molecular weight as factors in determining the solubility parameter.

The intrinsic viscosity, η, was calculated by taking the specific viscosity, $\eta_{sp}$, divided by the concentration (g/dl) over several concentrations and extrapolating to zero concentration. To verify the accuracy of the results the same was done with the natural log of the relative viscosity, $\eta_r$. The intrinsic, specific and relative viscosities are defined below:

$$\eta = (\eta_{sp}/c)_{c=0} = (\ln\eta_r/c)_{c=0}$$

$$\eta_{sp} = (t - t_0)/t_0$$

$$\eta_r = t/t_0$$

Where c=concentration of the polymer solution (g/dl), $t_0$=the time it takes for the neat solvent to run through the viscometer, t=the time it takes for the polymer solution to run through the viscometer.

Ideally, the lines formed by plotting the values determined by the two calculation methods described above (specific viscosity divided by concentration and the natural log of the relative viscosity) would meet at the same point to give the intrinsic viscosity value. In some tests this was not the case, therefore error bars were used to distinguish the possible range for each intrinsic viscosity value. In these cases the entire test was run at least twice to confirm results. Once the intrinsic viscosity was obtained, it was then plotted against the solubility parameter value for each copolymer solution (FIGS. 2, 3 and 4). FIG. 2 shows that the n-butyl bromide solvent gave the highest intrinsic viscosity value for PSA-5 (11 mol % silicon with a polar organic group). FIG. 3 shows that tetrahydrofuran gave the highest intrinsic viscosity value for PSA-6 (33 mol % silicon with a polar organic group). The solubility parameter for PSA-7 (53 mol % silicon with a polar organic group) tested between 9.1 and 9.2.

Figure 2: Solubility Parameter Plot for Poly(siloxane-acrylate) (PSA-5)

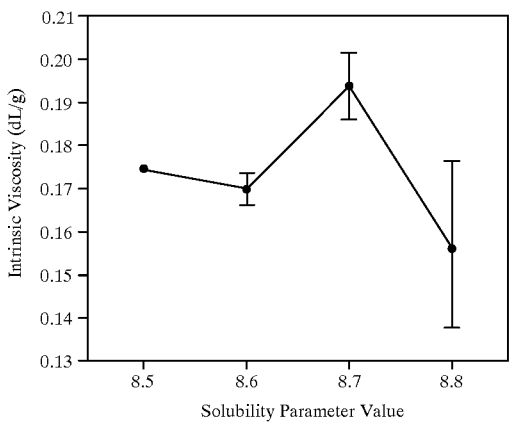

Figure 3: Solubility Parameter Plot for Poly(siloxane-acrylate) (PSA-6)

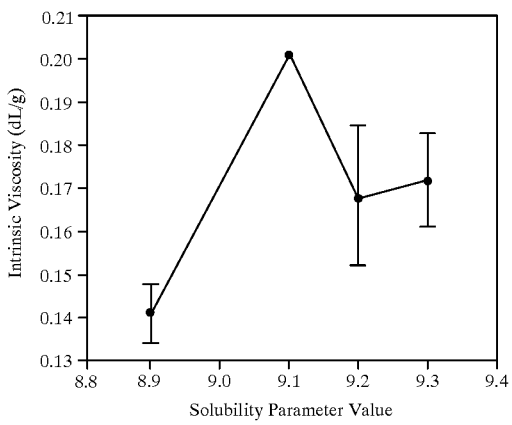

Figure 4: Solubility Parameter Plot for Poly(siloxane-acrylate) (PSA-7)

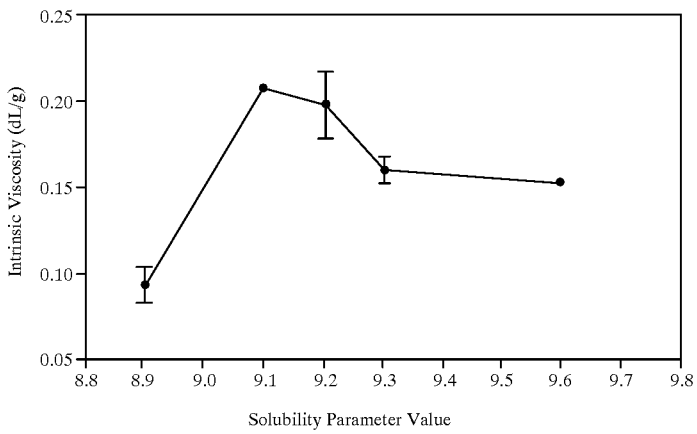

Formation of Poly(siloxane-acrylate) Elastomers

The poly(siloxane-acrylates) with 3 pendant vinyls and 2 terminal vinyls (PSA-1, PSA-2, PSA-3, PSA-4) were cured with 1 wt % 2,5-bis(tertbutyl peroxy)-2,5-dimethyl hexane at 177° C. for 10 min at 20 tons pressure and then postcured at 177° C. for 12 h with no pressure. The resulting poly (siloxane-acrylate)elastomers (E-1, E-2, E-3, E-4) were rubbery before postcuring; however, became brittle and appeared to have a very high crosslink density upon postcuring.

Elastomers were prepared and cured as follows: a mixer was charged with 20 g of the poly(siloxane-acrylate)and 0.2 g of 2,5-bis(tertbutyl peroxy)-2,5-dimethylhexane. The components were mixed for 12 sec, stirred with a spatula, and then mixed an additional 12 sec. The mixture was poured into circular chases and cured at 177° C. for 10 min at 20 tons pressure. Donut shaped samples were cut from some of the circular samples and then all the samples were postcured at 177° C. for 12 h with no pressure. The samples were brittle after postcuring. The donut shaped samples were used for a hot oil aging study, with the exception of E-7. A circular sample from each copolymer was cut in half and used for oil swell and weep properties.

The poly(siloxane-acrylates)with 2 terminal vinyls only (PSA-5, PSA-6, PSA-7) were cured with 1 wt % 2,5-bis (tertbutyl peroxy)-2,5-dimethylhexane (Varox) at 177° C. for 10 min at 20 tons pressure and then postcured at 177° C. for 4 h with no pressure in both the unfilled and filled elastomers. The resulting unfilled poly(siloxane-acrylate) elastomers (E-5,E-6,E-7) were rubbery before postcuring and lost some of their rubbery properties upon postcuring, especially in the materials with a higher mole percent of polar organic groups however, they were not as brittle as the copolymers with 5 vinyls. The resulting poly(siloxane-acrylate)elastomers filled with 30 wt % H2000 filler (trimethyl treated silica, Wacker H2000 with a surface area specification of 140+/−30 m2/g, Wacker-Chemie GmbH, Munchen Germany )(EF-5, EF-6, EF-7) were rubbery before and after postcuring and qualitatively had better physical properties than the unfilled materials.

Unfilled elastomers were prepared and cured as follows: composite mixer was charged with 10 g of the poly (siloxane-acrylate)and 0.1 g 2,5-bis(tertbutyl peroxy)-2,5-dimethyl hexane. The components were mixed for 12 sec, stirred with a spatula, and then mixed an additional 12 sec. The mixture was poured into circular chases and cured at 177° C. for 10 min at 20 tons pressure and then postcured at 177° C. for 4 h with no pressure. Circular samples from each copolymer were used for oil swell and weep properties.

Filled elastomers were prepared and cured as follows: a mixer was charged with 17.5 g of the copolymer, 7.5 g of $H_{2000}$ filler, and 0.175 g 2,5-bis(tertbutylperoxy)-2,5-dimethyl hexane. The components were mixed for 12 s, stirred with a spatula, and then mixed an additional 12 s. The mixture was poured into rectangular chases and cured at 177° C. for 10 min at 20 tons pressure. Donut shaped samples and dogbone shaped samples were cut from the slabs and then all the samples were postcured at 177° C. for 4 h with no pressure. The donut shaped samples were used in a hot oil aging study and the dogbone shaped samples were tested for mechanical properties and durometer.

An additional set of unfilled elastomers was prepared from PSA-5 (vinyl-containing poly(siloxane-acrylate) having 0.32% vinyl) using a hydrosilation cure system. Three samples were made from the polymer, each sample having a different level of SiH-containing crosslinker, and therefore having a different SiH: vinyl ratio, as shown in Table 11. The crosslinker used was trimethylsiloxy-terminated dimethyl, methylhydrogen siloxane, with 0.72 to 0.85% SiH. The catalyst used contained 0.4% 1,3 diethnyl -1,1,3,3-tetramethyldisiloxane complex of platinum in a silicone polymer carrier. The samples were cured for 10 minutes at 160C and had a very soft consistency.

Oil Swell and Weep Properties of Poly(siloxane-acrylate) Elastomers

Oil swell and weep properties were evaluated for both sets of unfilled poly(siloxane-acrylate) elastomers (E-1, E-2, E-3, E-4 and E-5, E-6, E-7) prepared as described above. The percent swell and weep number data for the unfilled peroxide-cured poly(siloxane-acrylate) elastomers prepared and described above are shown in Table 9 and Table 10. The data show that as the amount of polar oxycarbonylethyleneimino-containing organic groups (polar organic groups) increased, the swell decreased. The weep numbers for the polymers also decreased with increasing amounts of organic group in the polymer.

A description of the experiment used to test for oil swell and weep properties is described below.

Swell properties were measured in 150° C. engine oil after 48 hours and weep was measured after removing the elastomer from hot oil and allowing it to remain at ambient temperature for 48 hours. The oil used was Mobil Super HPâ 5 W30 SG, (Mobil Oil Corporation, Fairfax, Va. 22037).

The cured elastomer was swollen in 150° C. engine oil for 48 hours and then is removed from the hot oil, wiped clean with Kimwipes[â] within 30 seconds upon removal, and weighed within 30 seconds upon wiping. The swollen elastomer was allowed to "weep" for 48 hours, then wiped clean with Kimwipes[â] and weighed within 30 seconds after wiping. The percent swell was calculated as the percent of oil the elastomer takes up based on the weight of the original cured elastomer.

The "weep" was calculated as the percent of oil which weeps out of the gasket upon cooling for 48 hours based on the weight of the original cured elastomer.

TABLE 9

| Sample | Wt. Polymer (g) | Wt. Polymer + Oil 24 h-150° C. (g) | % Swell | Wt. Polymer + Oil 48 h-RT (g) | % Swell | Oil Weep (g) | Oil Weep/Polymer (× 100) |
| --- | --- | --- | --- | --- | --- | --- | --- |
| E-1 | 0.41 | 0.56 | 37 | 0.52 | 28 | 0.037 | 8.98 |
| E-2 | 0.38 | 0.49 | 29 | 0.47 | 25 | 0.017 | 4.52 |
| E-3 | 0.36 | 0.42 | 16 | 0.42 | 16 | 0.0005 | 0.14 |
| E-4 | 0.33 | 0.38 | 11 | 0.37 | 11 | 0.0006 | 0.18 |

E-1 = 10 mol % polar organic groups, E-2 = 30 mol % polar organic groups, E-3 = 50 mol % polar organic groups, E-4 = 70 mol % polar organic groups

TABLE 10

| Sample | Wt. Polymer (g) | Wt. Polymer + Oil 24 h-150° C. (g) | % Swell | Wt. Polymer + Oil 48 h-RT (g) | % Swell | Oil Weep (g) | Oil Weep/Polymer (× 100) |
| --- | --- | --- | --- | --- | --- | --- | --- |
| E-5-1 | 0.80 | 1.20 | 49.28 | 1.10 | 36.49 | 0.10 | 12.79 |
| E-5-2 | 0.79 | 1.19 | 49.71 | 1.08 | 36.61 | 0.10 | 13.10 |
| E-5-3 | 0.79 | 1.17 | 48.38 | 1.07 | 35.72 | 0.10 | 12.66 |
| E-6-1 | 0.80 | 1.03 | 29.57 | 0.99 | 24.01 | 0.04 | 5.56 |
| E-6-2 | 0.80 | 1.04 | 29.75 | 1.00 | 24.17 | 0.04 | 5.59 |
| E-6-3 | 0.81 | 1.05 | 29.19 | 1.00 | 23.27 | 0.05 | 5.92 |
| E-7-1 | 0.76 | 0.86 | 13.80 | 0.83 | 9.29 | 0.03 | 4.51 |
| E-7-2 | 0.64 | 0.73 | 14.26 | 0.70 | 10.34 | 0.02 | 3.92 |

E-5 = 11 mol % organo-silicon groups, E-6 = 33 mol % organo-silicon groups, E-7 = 53 mol % organo-silicon groups

TABLE 11

Formulations for Hydrosilation Cured Elastomers

| Ingredient | E9-1 | E9-2 | E9-3 |
| --- | --- | --- | --- |
| PSA-5 organo-silicone copolymer | 20 part by wt. | 20 part by wt. | 20 part by wt. |
| trimethylsiloxy-terminated dimethyl, methylhydrogen siloxane | 0.52 part by wt. | 0.66 part by wt. | 0.8 part by wt. |
| 0.4% 1,3 diethnyl-1,1,3,3-tetramethyldisiloxane copolymer of platinum in a silicone | 0.28 part by wt. | 0.28 part by wt. | 0.28 part by wt |
| SiH:Vi | 1.67 | 2.12 | 2.57 |

Thermal and Mechanical Properties of Poly(siloxane-acrylate) Elastomers

Thermogravimetric analysis was done on unfilled poly (siloxane-acrylate) elastomers (E-1, E-2, E-3, E-4) using a du Pont 2100 TGA at a heating rate of 10° C./min from 20–600° C. The TGA data showed that E-1 (10 mole percent polar organic group) was stable (no mass loss) up to 260° C. and that E-2 (30 mole percent polar organic group), E-3 (50 mole percent polar organic group), and E-4 (70 mole percent polar organic group) were stable up to 225° C. Since standard applications with motor oil are limited to 150° C. due to the degradation of the oil, these polymers upper temperature limit is high enough to be useful in these types of applications.

The physical properties of tensile strength, and elongation were measured on the EF-5, EF-6, and EF-7 elastomers (filled with 30 wt % H2000 treated silica filler, Wacker Chemie) using ASTM D 412. Dogbone shaped samples were cut with 0.157" widths, a range of thickness (68–72 mil), and 45 mm lengths.

Shore A durometer readings were taken on the same samples using a by ASTM D 2240.

The filled (30 wt % H2000) organo-silicone elastomers, EF-5, EF-6 and EF-7, had mean tensile strengths of 234, 171, and 217 psi, mean elongation of 31.95%, 14.82%, and 9.81%, and average Shore A durometer of 64, 76, and 87, respectively.

What is claimed is:

1. An poly(siloxane-acrylate) elastomer with oxycarbonylethyleneimino-containing organic groups formed by the steps of:
    (A) forming an amine functional alkenyl-containing siloxane by reacting a mixture comprising:
       (a) a polydiorganosiloxane,
       (b) an amino-functional silane hydrolyzate,
       (c) an alkenylorganosiloxane, and
       (d) a base equilibration catalyst,
    (B) reacting the amine functional alkenyl-containing siloxane with an acrylate to form a curable alkenyl-containing poly(siloxane-acrylate) with oxycarbonylethyleneimino-containing organic groups and,
    (C) curing the alkenyl-containing poly(siloxane-acrylate) to form an poly(siloxane-acrylate) elastomer.

2. The poly(siloxane-acrylate) elastomer of claim 1 where the polydiorganosiloxane is selected from the group consisting of compounds having the formula $R^2_3SiO(SiR^1_2O)_xSiR^2_3$ and $(SiR^1R^2O)_y$,
    where each $R^1$ is independently selected from the group consisting of a trifuoropropyl group, an alkyl group of 1 to 4 carbon atoms, and a phenyl group,
    $R^2$ is selected from the group consisting of an alkenyl group, a hydroxyl group, an alkoxy group, a trifluoropropyl group, an alkyl group of 1 to 4 carbon atoms, and a phenyl group,
    x has a value from 0 to about 15,
    and y has a value from about 3 to 12.

3. The poly(siloxane-acrylate) elastomer of claim 1 where the amino-functional silane hydrolyzate comprises amino groups substituted on silicon atoms selected from the groups consisting of —$CH_2CH_2CH_2NH_2$, —$CH_2CH_2CH_2N(H)CH_2CH_2NH_2$, —$CH_2CH_2CH_2N(H)CH_2CH_2N(H)CH_2CH_2NH_2$, —$H_2CH_2CH_2CH_2NH_2$, —$CH_2CH_2CH_2CH_2CH_2NH_2$, —$CH_2CH_2CH_2N(H)Me$, —$CH_2CH_2CH_2N(H)CH_2CH_2NMe_2$, —$CH_2CH_2CH_2N(H)Et$, —$CH_2CH(CH_3)CH_2N(H)CH_2CH_2NH_2$ and —$CH_2CH(CH_3)CH_2NH_2$.

4. The poly(siloxane-acrylate) elastomer of claim 1 where the amino-functional silane hydrolyzate is a hydrolyzate of 3-aminopropylmethyldiethoxysilane.

5. The poly(siloxane-acrylate) elastomer of claim 1 where the alkenylorganosiloxane is selected from compounds having the formula $R^7_3SiO(SiR^6_2O)_pSiR^7_3$ and $(SiR^6_2O)_q$,
    where each $R^6$ is independently selected from the group consisting of an alkenyl group comprising 2 to 8 carbon atoms, trifluoropropyl group, an alkyl group comprising about 1 to 4 carbon atoms, and a phenyl group,
    each $R^7$ is independently selected from the group consisting of alkenyl group comprising about 2 to 8 carbon atoms, a trifluoropropyl group, an alkyl group of 1 to 4 carbon atoms, a phenyl group,
    p is 0 to 15,000, and
    q is 3 to 12.

6. The poly(siloxane-acrylate) elastomer of claim 1 where the base equilibration catalyst is selected from the group consisting of alkali metal hydroxides, alkali metal silanolates, and alkali metal alkoxides.

7. The poly(siloxane-acrylate) elastomer of claim 1 where the base equilibration catalyst is potassium hydroxide.

8. The poly(siloxane-acrylate) elastomer of claim 1 where the acrylate is added at such that the ratio of amine functional groups provided by the amine functional alkenyl-containing siloxane of Step (A) to the acrylate of Step (B) is in a ratio of about 1 to 0.5.

9. The poly(siloxane-acrylate) elastomer of claim 1 where the acrylate is selected from the group consisting of butyl acrylate, polyethylene glycol monoacrylate, polypropylene glycol monoacrylate, tetrafluoropropyl acrylate, methoxypoly (ethyleneoxy) ethyl acrylate, 1,6 hexanediol diacrylate, 1,4-butanediol diacrylate, ethylene glycol diacrylate, diethylene glycol diacrylate, tetraethylene glycol diacrylate, tripropylene glycol diacrylate, neopennyl glycol diacrylate, 1,4-butanediol dimethacrylate, poly (butanediol) diacrylate, tetraethyleneglycol dimethacrylate, 1,3-butylene glycol diacrylate, triethylene glycol diacrylate, polyethylene glycol diacrylate, bisphenol A dimethacrylate, trimethylolpropane triacrylate, trimethylolpropane trimethacrylate, pentaerythritolmonohydroxytriacrylate, di-trimethylolpropane tetraacrylate, and dipentaerythritol (monohydroxy) penta-acrylate, diethyleneglycol diacrylate, tetraethyleneglycol diacrylate, and polyethylene glycol diacrylate.

10. The poly(siloxane-acrylate) elastomer of claim 1 wherein Step (C) comprises adding a peroxide curing catalyst.

11. The poly(siloxane-acrylate) elastomer of claim 10 wherein the peroxide curing catalyst is 2,5-bis (tertbutylperoxy)-2,5-dimethylhexane.

12. The poly(siloxane-acrylate) elastomer of claim 1 wherein Step (C) comprises adding a silicon-hydride-containing crosslinking agent and a platinum group curing catalyst.

13. The poly(siloxane-acrykate elastomer of claim 12 wherein the silicon-hydride-containing crosslinker agent is added in amount such the ratio of silicon hydride to alkenyl groups on the the curable alkenyl-containing poly(siloxane-acrylate) is about 2.5 to 1.

14. A method of making a curable alkenyl-containing poly(siloxane-acrylate) comprising the steps of
   (A) forming an amine functional alkenyl-containing siloxane reacting a mixture comprising:
      (a) a polydiorganosilxane,
      (b) an amino-functional silane hydrolyzate,
      (c) an alkenylorganosiloxane, and
      (d) a base equlibration catalyst, and
   (B) reacting the amine functional alkenyl-containing siloxane with an acrylate to form curable alkenyl-containing poly(siloxane-acrylates).

* * * * *